United States Patent
Zhao et al.

(10) Patent No.: US 11,217,001 B2
(45) Date of Patent: Jan. 4, 2022

(54) SYSTEMS AND METHODS FOR SUPERVISED AND UNSUPERVISED ANIMATION STYLE TRANSFER

(71) Applicant: Electronic Arts Inc., Redwood City, CA (US)

(72) Inventors: Yiwei Zhao, Sunnyvale, CA (US); Igor Borovikov, Foster City, CA (US); Maziar Sanjabi, San Mateo, CA (US); Mohsen Sardari, Redwood City, CA (US); Harold Chaput, Belmont, CA (US); Navid Aghdaie, San Jose, CA (US); Kazi Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 9 days.

(21) Appl. No.: 16/896,541

(22) Filed: Jun. 9, 2020

(65) Prior Publication Data
US 2021/0383585 A1    Dec. 9, 2021

(51) Int. Cl.
   *G06T 13/40*    (2011.01)
   *G06N 3/08*     (2006.01)
   *G06K 9/62*     (2006.01)

(52) U.S. Cl.
   CPC ............ *G06T 13/40* (2013.01); *G06K 9/6256* (2013.01); *G06N 3/08* (2013.01)

(58) Field of Classification Search
   CPC .................................. G06T 13/40; G06N 3/08
   See application file for complete search history.

(56) References Cited

U.S. PATENT DOCUMENTS 7,403,202 B1    7/2008   Nash

OTHER PUBLICATIONS

Smith, Harrison Jesse, et al. "Efficient neural networks for real-time motion style transfer." Proceedings of the ACM on Computer Graphics and Interactive Techniques 2.2 (2019): 1-17.*
Holden, Daniel, et al. "Fast neural style transfer for motion data." IEEE computer graphics and applications 37.4 (2017): 42-49.*
Wang, Qi, et al. "Transferring style in motion capture sequences with adversarial learning." ESANN. 2018.*

\* cited by examiner

*Primary Examiner* — Matthew Salvucci
(74) *Attorney, Agent, or Firm* — Leydig, Voit & Mayer, Ltd.

(57) ABSTRACT

A method, computer-readable storage medium, and device for generating an animation sequence are disclosed. The method comprises: receiving an input animation sequence, wherein the input animation sequence comprises character position information over a series of frames and a first style tag; executing an encoder to process the input animation sequence to generate a compressed representation of the input animation sequence, wherein the compressed representation of the input animation sequence comprises a vector representing the input animation sequence; and executing a decoder to generate an output animation sequence, wherein executing the decoder is based on the compressed representation of the input animation sequence, wherein the output animation sequence comprises character position information over a series of frames, and wherein the output animation sequence is based on the input animation sequence and comprises a second style tag.

18 Claims, 15 Drawing Sheets

SYSTEMS AND METHODS FOR SUPERVISED AND UNSUPERVISED ANIMATION STYLE TRANSFER

FIELD

This disclosure generally relates to computer graphics and, more particularly, to systems and methods for supervised and unsupervised animation style transfer.

BACKGROUND

Animation is the process of generating successive scenes such that when corresponding frames are displayed in sequence, characters or other objects in the scene appear to move. Where the character represents a life form, it is desirable for the character to move in a natural-looking manner.

Generally, movement (or more precisely, the animation of simulated movement) can be inanimate movement or animate movement. In many cases, inanimate movement, such as the movement of a net in response to receiving a basketball, can be simulated using a physics engine that determines movement based on interactions between simulated objects. Animate movement is more complicated, as users and viewers of the animation expect natural movement. With some characters, especially simulated human beings, it is challenging to convey natural movement.

In most three-dimensional (3D) computer animation systems, an animator creates a simplified representation of a character's anatomy, which may be analogous to a skeleton. Movement of the character over successive frames defines an animation for the character. The animation can be created various ways, including manually by an animator (e.g., using keyframing) or by motion capture, for example.

A problem exists in the art where a first amination that is generated for a first character is desired to be transferred to a second character. For example, an animation exists of a first character performing an animation to move from a sitting position to a standing position. If we have a second character that the animator wishes to have perform the same animation (e.g., move from a sitting position to a standing position), the animator would need to animate the second character to perform the motion, either manually or by motion capture of the second character performing the motion. This process is tedious. Moreover, manually creating new animations does not necessarily transfer other characteristics of the motion.

As such, there remains a need in the art for a system and method for creating animations that overcome the drawbacks and limitations of existing approaches.

SUMMARY

Embodiments of the disclosure provide a method, computer-readable storage medium, and device for generating an animation sequence. The method comprises: receiving, by one or more processors, an input animation sequence, wherein the input animation sequence comprises character position information over a series of frames and a first style tag; executing, by the one or more processors, an encoder to process the input animation sequence to generate a compressed representation of the input animation sequence, wherein the compressed representation of the input animation sequence comprises a vector representing the input animation sequence; and executing, by the one or more processors, a decoder to generate an output animation sequence, wherein executing the decoder is based on the compressed representation of the input animation sequence, wherein the output animation sequence comprises character position information over a series of frames, and wherein the output animation sequence is based on the input animation sequence and comprises a second style tag.

In one aspect, the method further comprises: training the encoder based a first set of animation sequences, wherein each animation sequence in the first set of animation sequences corresponds to the first style tag; and training the decoder based a second set of animation sequences, wherein each animation sequence in the second set of animation sequences corresponds to the second style tag.

In another aspect, the method further comprises: training the encoder based a set of training animation sequences, wherein each training animation sequence in the set of training animation sequences is coded with one or more style tags; and training the decoder based the set of training animation sequences, wherein for each training animation sequence in the set of training animation sequences, the decoder is configured to reconstruct an output animation sequence that approximates the training animation sequence based on decoding a compressed representation of the training animation sequence encoded by the encoder.

In yet another aspect, the method further comprises: receiving a reference style animation sequence, wherein the reference style animation sequence comprises character position information over a series of frames and the second style tag; executing the encoder to process the reference style animation sequence to generate a compressed representation of the reference style animation sequence, wherein the compressed representation of the reference style animation sequence comprises a vector representing the reference style animation sequence; and performing an optimization function based on the compressed representation of the input animation sequence and the compressed representation of the reference style animation sequence to generate a compressed target representation; wherein executing the decoder to generate the output animation sequence comprises: processing the compressed target representation by the decoder to generate the output animation sequence.

DETAILED DESCRIPTION

Figure 1:
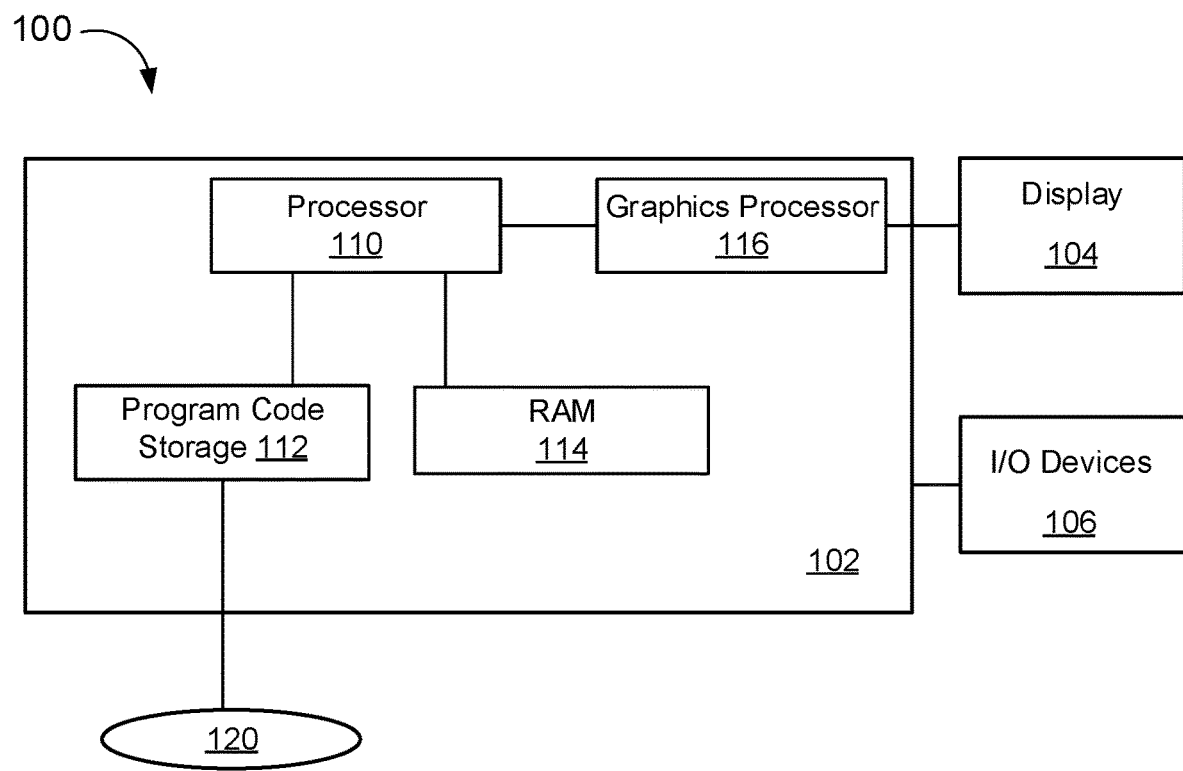
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide systems and methods for transferring a "style" of one animation to another animation to generate an output animation. In one use case, embodiments of the disclosure can be used to create variant contents (such as for games). Instead of manually creating the variant content repeatedly, embodiments of the disclosure propose a data-driven approach to learn from the existing animation assets and transfer animation style automatically.

In various embodiments, the disclosed approaches train one or more models from either a paired or unpaired dataset and transfer styles in a supervised or unsupervised way, as described in greater detail below.

Taking the context of video games as an example, the display of a video game is generally a video sequence presented to a display capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can thought of as a view into a computer-generated scene at a particular time or short time window. For example, with 60 frame-per-second video, if one frame represents the scene at t=0, then the next frame would represent the scene at t=1/60 second. In some cases, a frame might represent the scene from t=0 to t=1/60, but in the simple case, the frame is a snapshot in time.

A "scene" comprises those simulated objects that are positioned in a world coordinate space within a view pyramid, view rectangular prism or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects with some of the objects being animated, in that the objects appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

In some embodiments, a character may be modeled as a skeleton comprising a plurality of body parts with joint constraints. Joint constraints might include attachment points (some of which might be pivot-able), range of motion, degrees of freedom, masses, and possibly strength limits and distribution of masses. For example, a football player might be modeled with a torso, upper arms, forearms, head, waist, legs, fingers, etc., with the upper arm constrained to remain joined to the forearm at the elbow with less than 180 degrees of joint movement at the elbow. In some embodiments, a skeleton can thus be represented in game data structures as a collection of body part data structures and a collection of joint constraints. A skeleton data structure might include data to hierarchically link body parts, such as pointers to parent and child body parts. A skeleton in an animated motion might further include as part of its state the positions/orientations of skeleton parts, velocity/angular moment and a set of force/torque vectors on some or all body parts for each frame of the animated motion.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
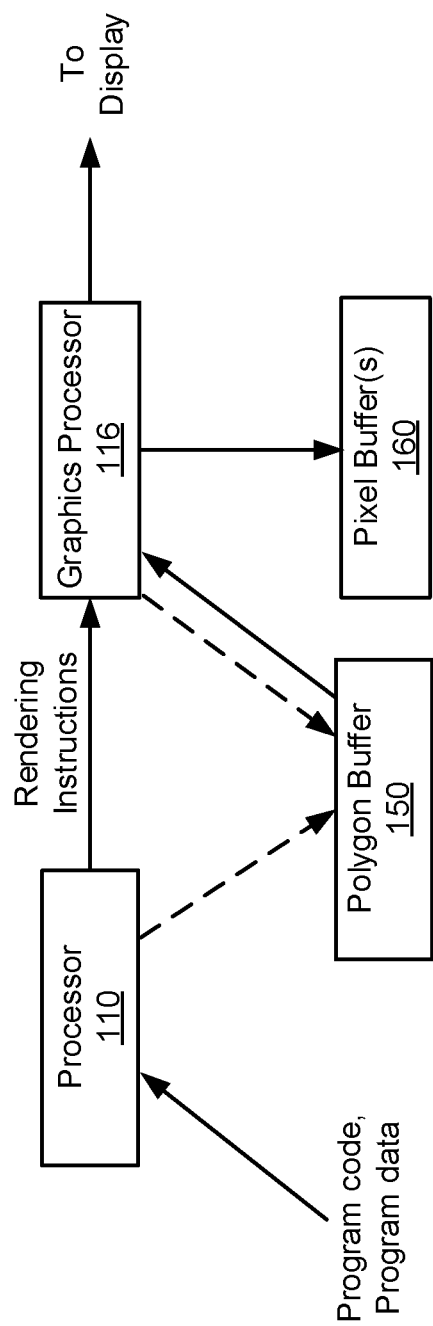
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
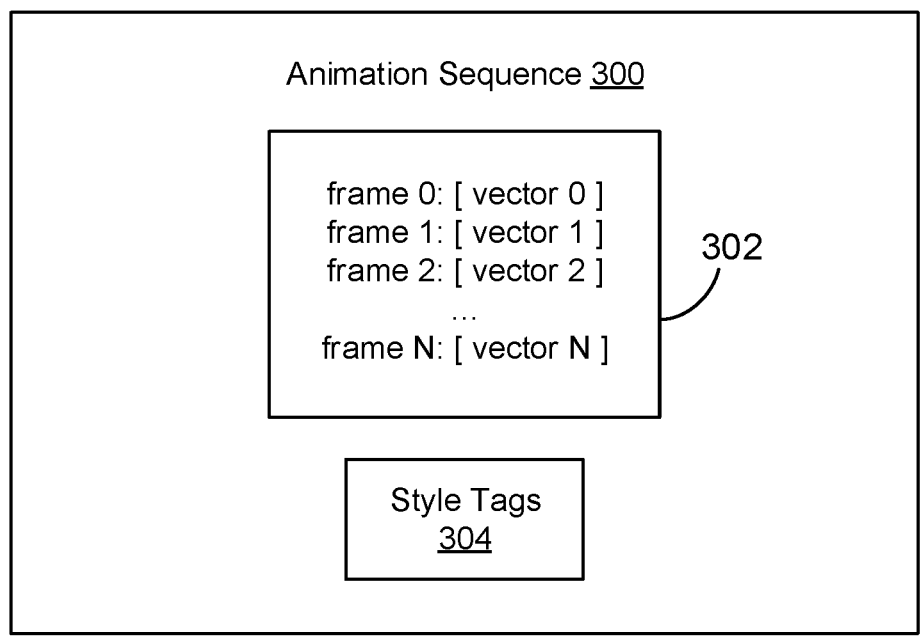
FIG. 3 is a block diagram illustrating a data structure for an animation sequence, according to one embodiment.

FIG. 3 is a block diagram illustrating a data structure for an animation sequence, according to one embodiment. As described in greater detail herein, embodiments of the disclosure provide techniques to transfer an animation style from an existing animation to another animation to generate an output animation.

In one embodiment, an animation sequence 300 may comprise animation data 302 and style tags 304. In one embodiment, as described above, a character that is being animated comprises a series of joints (e.g., M joints) that comprise the skeleton of the character, optionally including other parameters, such as constraints among the joints. For an animation sequence, such as animation sequence 300, information about the position of each joint of the character for a given frame can be stored in a vector for the given frame. As shown, the animation sequence 300 comprises a series of frames (e.g., N frames). As shown in FIG. 3, for a given animation sequence 300 of N frames, each frame corresponds to a position vector of the joints of the character for that frame. For example, frame 0 corresponds to [vector 0], frame 1 corresponds to [vector 1], and frame N corresponds to [vector N]. Each vector has M components corresponding to the M joints of the character. In some embodiments, additional metadata may be associated with the animation sequence 300, such as joint constraints, a root trajectory of the character, rotation information about certain joints, among other things.

The animation sequence also includes zero or more style tags 304. As used herein, an animation "style" is a characteristic of the amination. In some embodiments, the style tags 304 can grouped into style categories.

Figure 4:
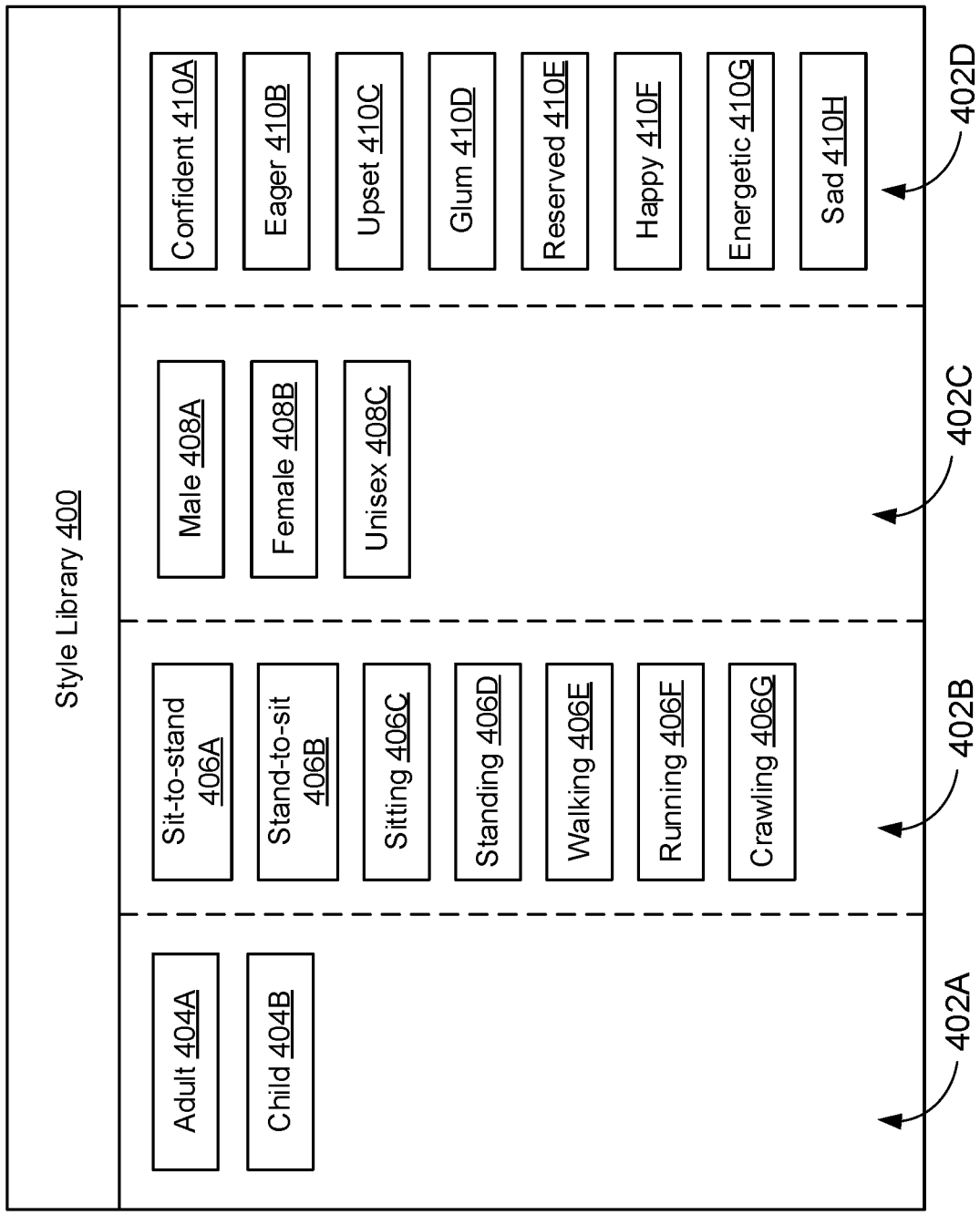
FIG. 4 is as example of a style library comprising example style tags that can be associated with an animation sequence, according to one embodiment.

FIG. 4 is as example of a style library 400 comprising example style tags that can be associated with an animation sequence, according to one embodiment. The style library 400 may be stored in a database accessible to a processor (e.g., processor 110 or graphics processor 116) used to generate or display animation sequences. As shown, the style library 400 is organized into style categories 402A-402D. In this non-limiting example, style category 402A corresponds to adult/child motion styles, style 402B corresponds to motion actions, style category 402C corresponds to gender motion styles, and style category 402D corresponds to emotion styles.

Style category 402A includes styles for adult 404A and child 404B, for example. As an example, a child performs a given movement (e.g., walking) differently than an adult performing the same movement. This may be because of different characteristics of a child, such as immaturity of physiological structure, that causes the differences in the movement. To make more life-like animations, an child performing the same movement as an adult may be animated differently to capture the "child-like" characteristics of the child performing the movement.

Style category 402B includes styles for motion actions, including, for example, sit-to-stand motion 406A, stand-to-sit motion 406B, sitting motion 406C, standing motion 406D, walking motion 406E, running motion 406F, crawling motion 406G, etc.

Style category 402C includes styles for male 408A, female 408B, and unisex 408C. In some instances, gender may play a role in animating natural-looking animation. As an example, a female character walking may sway more in the hips than a male character walking, even if the animated characters have the same skeleton structure.

Style category 402D includes styles for emotion, including, for example, confident 410A, eager 410B, upset 410C, glum 410D, reserved 410E, happy 410F, energetic 410G, sad 410H, among others. Two adult characters performing the same motion (e.g., walking) can be animated differently depending on which emotion is associated with the characters. For example, a confident adult walking may be more upright than a sad adult walking.

The style categories 402A-402D in FIG. 4 are merely examples, and in other embodiments other style categories may be implemented. In still further embodiments, the styles may not be grouped into style categories at all, and there may simply be a collection (e.g., listing) of possible style options in the style library 400.

As described, a given animation sequence (e.g., animation sequence 300), can include style tags 304 (for example, implemented as a binary indicator) as to which styles the animation sequence 300 is associated with. For example, an animation of a character walking, can be associated with the adult style 404A, walking style 406E, male style 408A, and confident style 410A.

Figure 5:
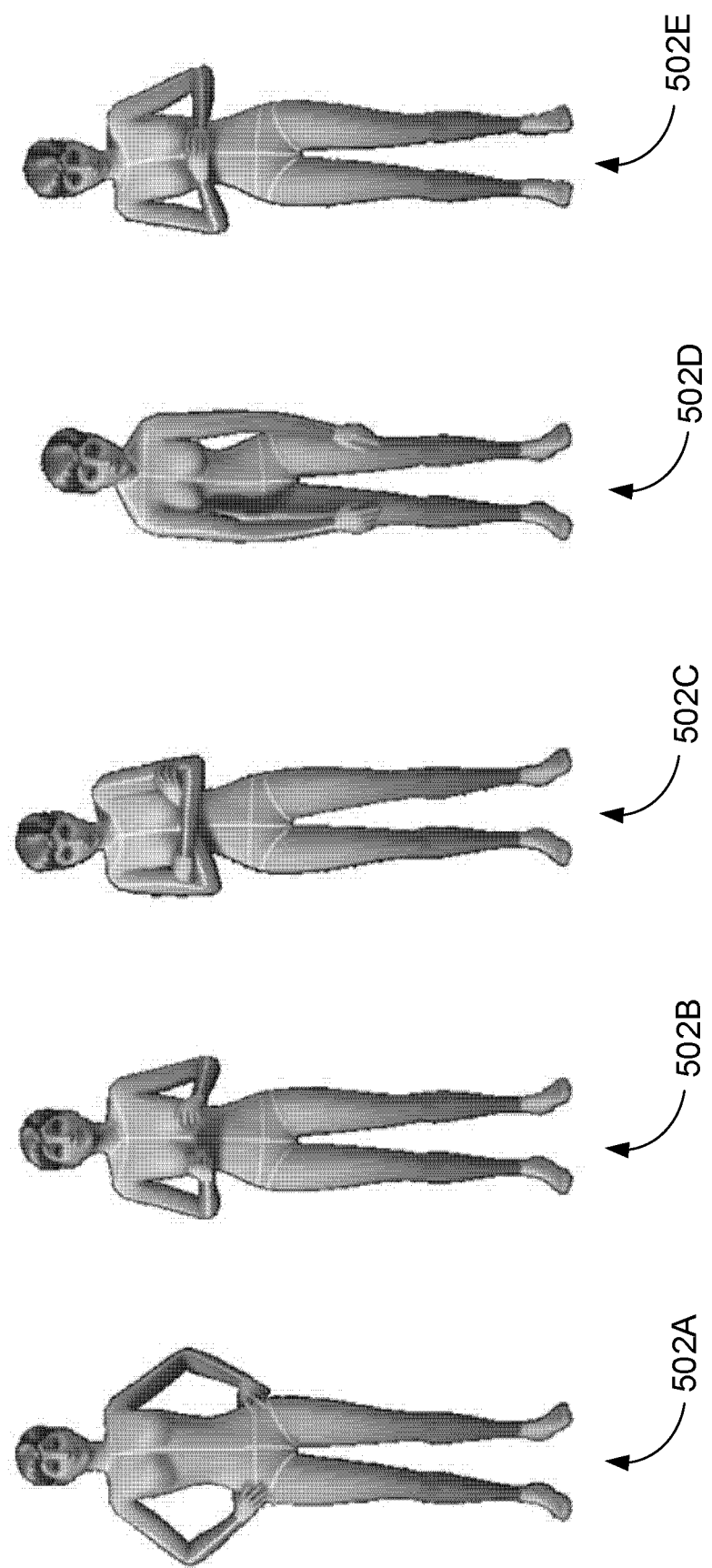
FIG. 5 shows examples of an animated character standing having different emotion styles, according to one embodiment.

FIG. 5 shows examples of an animated character standing having different emotion styles, according to one embodiment. As shown in FIG. 5, a female character is performing a standing animation. The animation may be associated with different emotion styles. For example, character animation 502A is associated with a confident animation style, character animation 502B is associated with an eager animation style, character animation 502C is associated with an upset animation style, character animation 502D is associated with a glum animation style, and character animation 502E is associated with a reserved animation style. As shown, although each character animation 502A-502E shows a standing animation for the same character (i.e., an adult female), the movements of the character and positions of the various joints of the character can vary widely based on the emotion style tag associated with the character animation to convey emotional variation in the animations.

Figure 6:
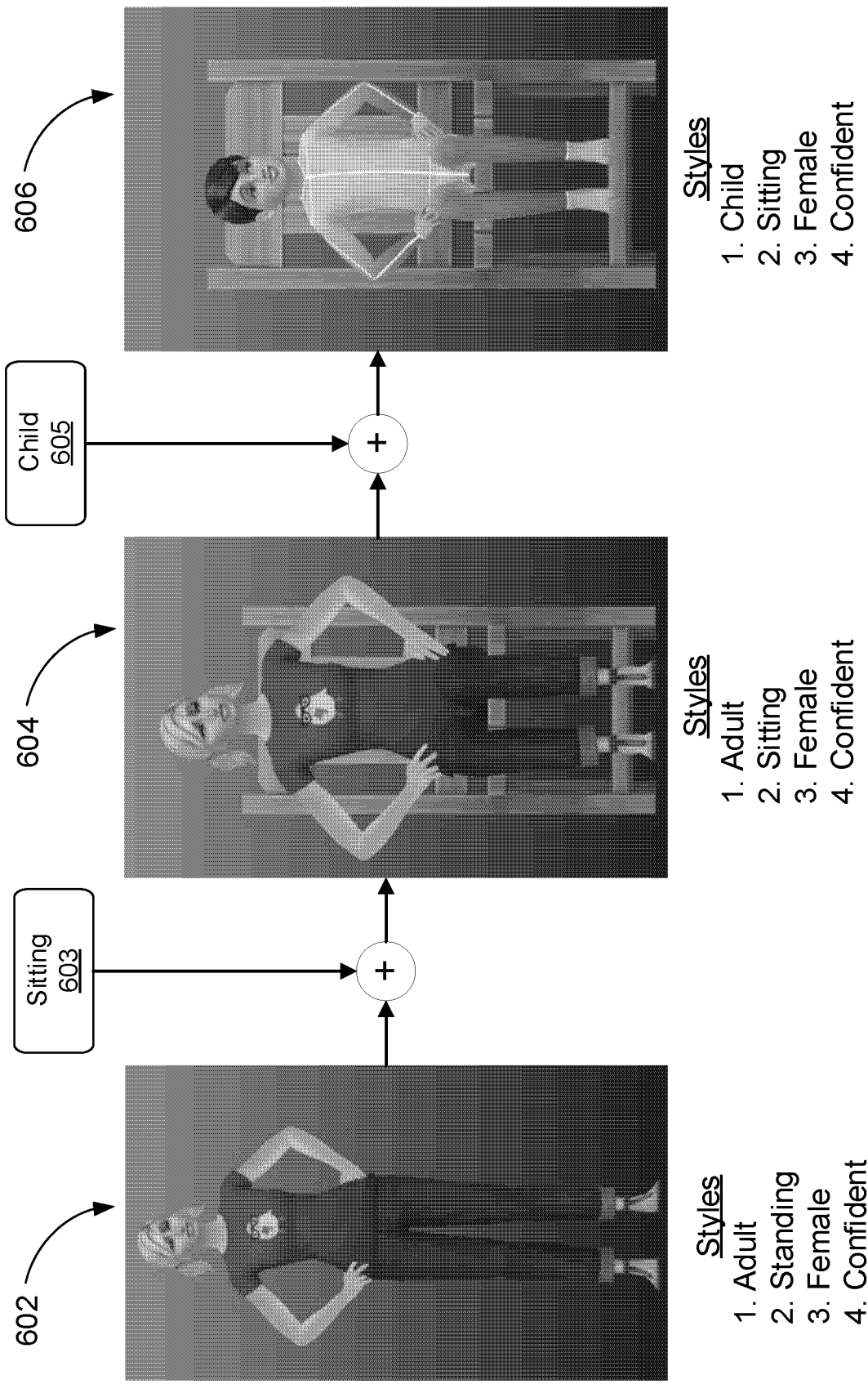
FIG. 6 shows examples of transferring an animation style from one animation to another animation, according to one embodiment.

FIG. 6 shows examples of transferring an animation style from one animation to another animation, according to one embodiment. As discussed herein, embodiments of the disclosure provide techniques to transferring (or injecting) a style into a first animation to generate an output animation. As shown in FIG. 6, an input animation 602 may correspond to an animation associated with four style tags for (1) adult, (2) standing motion, (3) female, and (4) confident. In the example in FIG. 6, the "confident" emotion animation style is reflected by the hands on hips and head held high (see, character animation 502A associated with a confident animation style in FIG. 5).

Suppose, example, that there is a desire to transfer a sitting motion style 603 into the input animation 602. In the example shown in FIG. 6, a first output animation 604 can be generated based on combining the input animation 602 and the sitting motion style 603. In effect, the first output animation 604 would include the same styles as the input animation 602, except the standing motion style of the input animation 602 is replaced with an a sitting motion style 603. As shown, the first output animation 604 may correspond to an animation associated with four style tags for (1) adult, (2) sitting motion, (3) female, and (4) confident.

Continuing with the example shown in FIG. 6, suppose that there is a desire to transfer a child motion style 605 into the first output animation 604. A second output animation 606 can be generated based on combining the first output animation 604 and the child motion style 605. The second output animation 606 includes the same styles as the first output animation 604, except the adult motion style of the first output animation 604 is replaced with the child motion style 603. As shown, the second output animation 606 may correspond to an animation associated with four style tags for (1) child, (2) sitting motion, (3) female, and (4) confident.

In some implementations, when developing game assets, especially animation assets, for common movement for two characters, there are different conditions to satisfy for the different characters. For example, in the case of a motion of sitting in a chair (such as animations 604 and 606 in FIG. 6), there may be different conditions for an adult character versus a child character. As shown in FIG. 6, for the adult character, the character's feet are planted on the floor in the animation 604. By contrast, for the child character, the character's feet are floating in the air in the animation 606. As such, in the adult animation 604, there may be no movement in the legs; whereas, in the child animation 606, the legs may be swaying slightly as the child character sits in the chair. The waving legs in the child animation 606 are one example of a different condition to satisfy in the "style" of sitting in a chair for a child character versus an adult character. Although both characters are performing the same general motion (i.e., sitting in a chair), how the characters perform the motion has individualized "style" for a child versus and adult character.

As discussed in greater detail below, transferring an animation style into an input animation to generate an output animation can be performed using supervised animation style transfer or unsupervised animation style transfer.

Supervised Animation Style Transfer

One embodiment for animation style transfer is referred to herein as "supervised animation style transfer."

Figure 7:
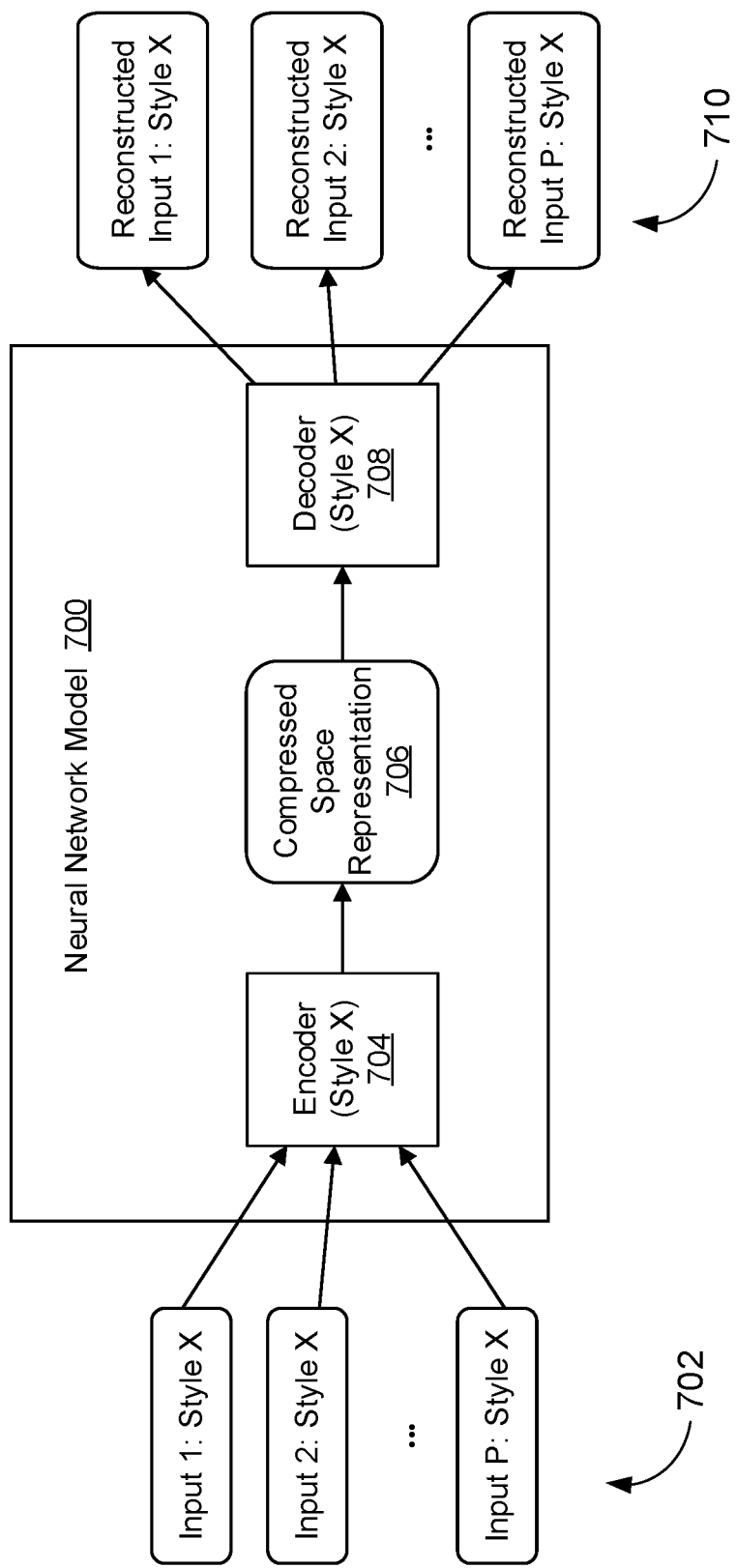
FIG. 7 is block diagram illustrating training a neural network model to transfer a style to an input animation to generate an output animation in supervised animation style transfer, according to one embodiment.

FIG. 7 is block diagram illustrating training a neural network model 700 to transfer a style to an input animation to generate an output animation in supervised animation style transfer, according to one embodiment. In supervised animation style transfer, a separate encoder and decoder is trained for each style. Using emotion styles as an example, say there are five different emotion styles. Each emotion style would correspond to its own encoder and own decoder. Training an individual encoder and decoder for a given style is shown in FIG. 7. The training process would then be repeated for each style to train an encoder and a decoder for the given style.

As shown in FIG. 7, a series of "P" input animations 702 (i.e., labeled "Input 1" to "Input P") is input into the neural network model 700. In one embodiment, the neural network model 700 comprises an autoencoder. Autoencoders are a type of learning model that can learn to generate a compressed space representation of input data using an encoder and then decode the compressed representing using a decoder to reconstruct the input data. The autoencoder may be implemented as a convolutional neural network (CNN).

A CNN is a type of machine learning implementation. A CNN consists of a number of layers of "neurons" or "feature maps," also called convolution layers, followed by a number of layers called fully connected layers. The output of a feature map is called a feature. In the convolution layers, the CNN extracts the essential aspects of an input (e.g., an input animation 702) in a progressively hierarchical fashion (i.e., from simple to complex) by combinatorically combining features from the previous layer in the next layer through a weighted non-linear function. In the fully connected layers, the CNN then associates the most complex features of the input computed by the last convolution layer with any desired output type, e.g., compressed space representation 706, by outputting a non-linear weighted function of the features. The various weights are adjusted during training, by comparing the actual output of the network with the desired output and using a measure of their difference ("loss function") to calculate the amount of change in weights using a backpropagation algorithm.

In the example shown in FIG. 7 for training an encoder and corresponding decoder for a given "style," each input animation 702 may be associated with a style tag corresponding to the style being trained. For example, for a "happy" emotion style, each input animation 702 is associated a style tag for the "happy" emotion style.

In another embodiment, there are no style tags associated with the input animations 702; rather, the input animations 702 that are input into the neural network model 700 are partitioned from a larger set of available animations as the animations that exhibit the desired "style." For example, given a set of 100 different animations, a user may manually select which animations exhibit a "happy" emotion style, and then the user may select those animations to be input into the neural network model 700 to train the encoder and decoder for the "happy" animation style.

For a given input animations, the encoder 704 is trained to map the sequence of motion of the input animation into a "compressed space representation" (also referred to as a "latent space representation") 706. In one embodiment, the compressed space representation 706 may be a fixed length vector that provides a compressed space representation of the input data. The data in the compressed space representation 706 is then input into a decoder 708 that is trained to recover the motion in the corresponding input animation from the compressed space representation 706, shown as reconstructed input animations 710.

A convolutional neural network (CNN) is one embodiment of the neural network model 700. In various implementations, the neural network model 700 utilizes a trainable parameter and network structure to represent high-dimensional numerical mappings. In the embodiment of a CNN as the neural network model 700, the CNN utilizes the convolutional function with trainable parameters to achieve property of shift invariance. Each convolutional function represents one layer, and the neural network model 700 is composed of several layers to represent complex functionality. In one embodiment, a CNN may be useful for animation data since the mapping for animation may be time-invariant, meaning the same acting of a character should be mapped to a same other acting of a character no matter when the acting is happening. In some implementation, compared with other time-invariant mapping schemes, a CNN may be easier to train.

As described, in some embodiments, the neural network model 700 (for example, a CNN) can take as an input a variety of motion representations. In other embodiments, input into the neural network model 700 for training is a dense representation where the motion tracks are key-framed at each frame, meaning that the information about animation is fully unpacked and present explicitly. The exact nature of this information representation may vary in different implementations. For example, one implementation can use coordinates for the bones in the local space of the character. Other implementations may use quaternions, or dual-quaternions, or Euler angles, etc., that are encoded for each frame.

The architecture of the CNN can also vary in various embodiments, depending on the complexity of the tasks that the CNN is trained for. Deeper CNNs may better handle complex motions, and large convolution filters may be better suited for enforcing short-term correlations. The resulting architecture, size of convolution filters, and the number of the neurons in the top layers (i.e., where the output is produced), can be discovered by the meta-parameters search and by visual evaluation of the results. The weights of parameters in the CNN can be learned from the training data in one embodiment. In other embodiments, it is also possible to run scripted pre-processing or post-processing on the input or output animations. The exact nature of such pre-processing or post-processing, in various embodiments, may depend on the particularities of the concrete set of the processed animations and is part of the technical art pipeline.

Figure 8:
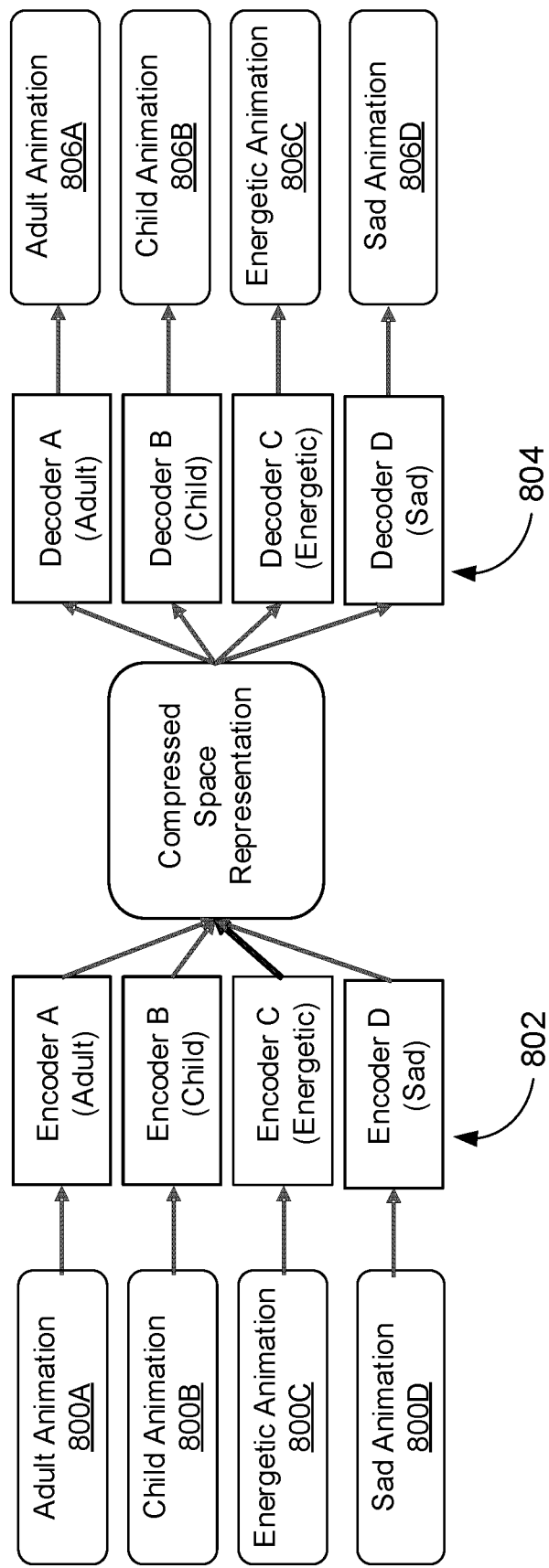
FIG. 8 is a conceptual diagram illustrating a framework for supervised animation style transfer, according to one embodiment.

FIG. 8 is a conceptual diagram illustrating a framework for supervised animation style transfer, according to one embodiment. FIG. 8 illustrates an example framework once an encoder and decoder are trained for each style.

A series of encoders 802 is shown in FIG. 8, where each encoder is trained to accept input of a particular animation style 800A-800D. In FIG. 8, Encoder A is trained to accept an animation sequence 800A corresponding to an "adult" animation style, Encoder B is trained to accept an animation sequence 800B corresponding to a "child" animation style, Encoder C is trained to accept an animation sequence 800C corresponding to an "energetic" animation style, and Encoder D is trained to accept an animation sequence 800D corresponding to a "sad" animation style.

Also shown in FIG. 8 is series of decoders 804, where each decoder is trained to accept a compressed space representation of an input animation as input and decode the compressed space representation into an animation sequence corresponding to the style of the decoder. In FIG. 8, Decoder A is trained to accept a compressed space representation and generate an "adult" animation sequence 806A, Decoder B is trained to accept a compressed space representation and generate a "child" animation sequence 806B, Decoder C is trained to accept a compressed space representation and generate an "energetic" animation sequence 806C, and Decoder D is trained to accept a compressed space representation and generate a "sad" animation sequence 806D.

Figure 9:
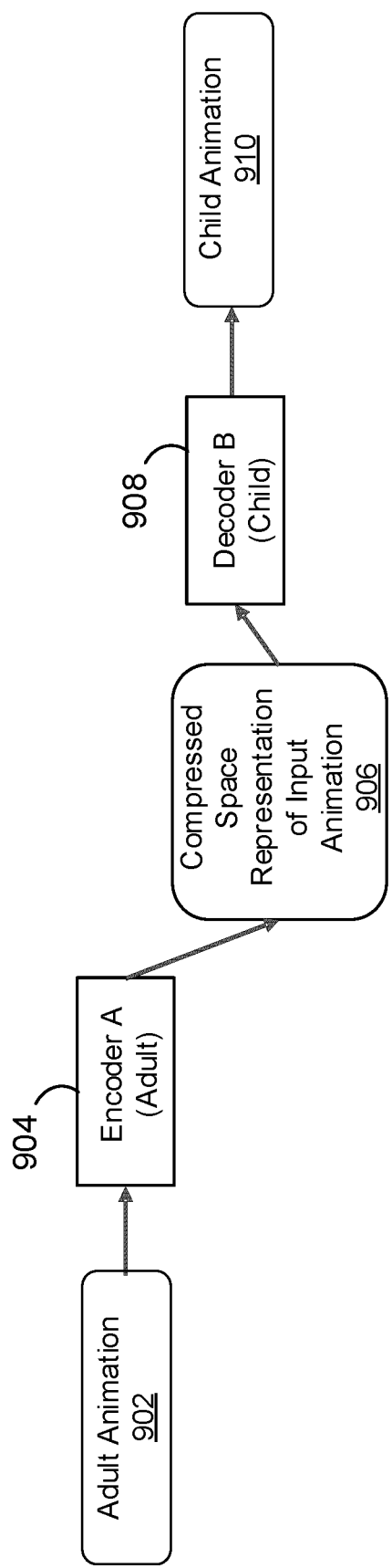
FIG. 9 is a conceptual diagram illustrating using the framework for supervised animation style transfer to generate an output animation, according to one embodiment.

FIG. 9 is a conceptual diagram illustrating using the framework for supervised animation style transfer to generate an output animation, according to one embodiment. As shown in FIG. 9 an input animation 902 is selected from a set of existing animations sequences. As described, the input animation 902 is tagged as corresponding to a set of animations styles.

In one embodiment, the goal of the supervised style transfer framework shown in FIG. 9 is to generate an output animation in which a first style corresponding to the input animation 902 is replaced with a different style. To accomplish this, the input animation 902 is input into an encoder 904 that is trained on the first style that will be replaced in the input animation 902. In the example shown, the input animation 902 is associated with an adult animation style, and the goal is generate an output animation where the adult animation style of the input animation 902 is replaced with a child animation style. As such, the input animation is input into the encoder 904 corresponding to the adult animation style. The output of the encoder 904 is compressed space representation 906 of the input animation in the compressed/latent space. The compressed space representation 906 is then input into a decoder corresponding to the desired output animation style. As previously described, in the example shown in FIG. 9, the goal is generate an output animation where the adult animation style of the input animation 902 is replaced with a child animation style in the output animation. As such, the compressed space representation 906 is input into a decoder 908 corresponding to the child animation style. The output of the decoder 908 is an output animation 910 having the desired "child" animation style.

Figure 10:
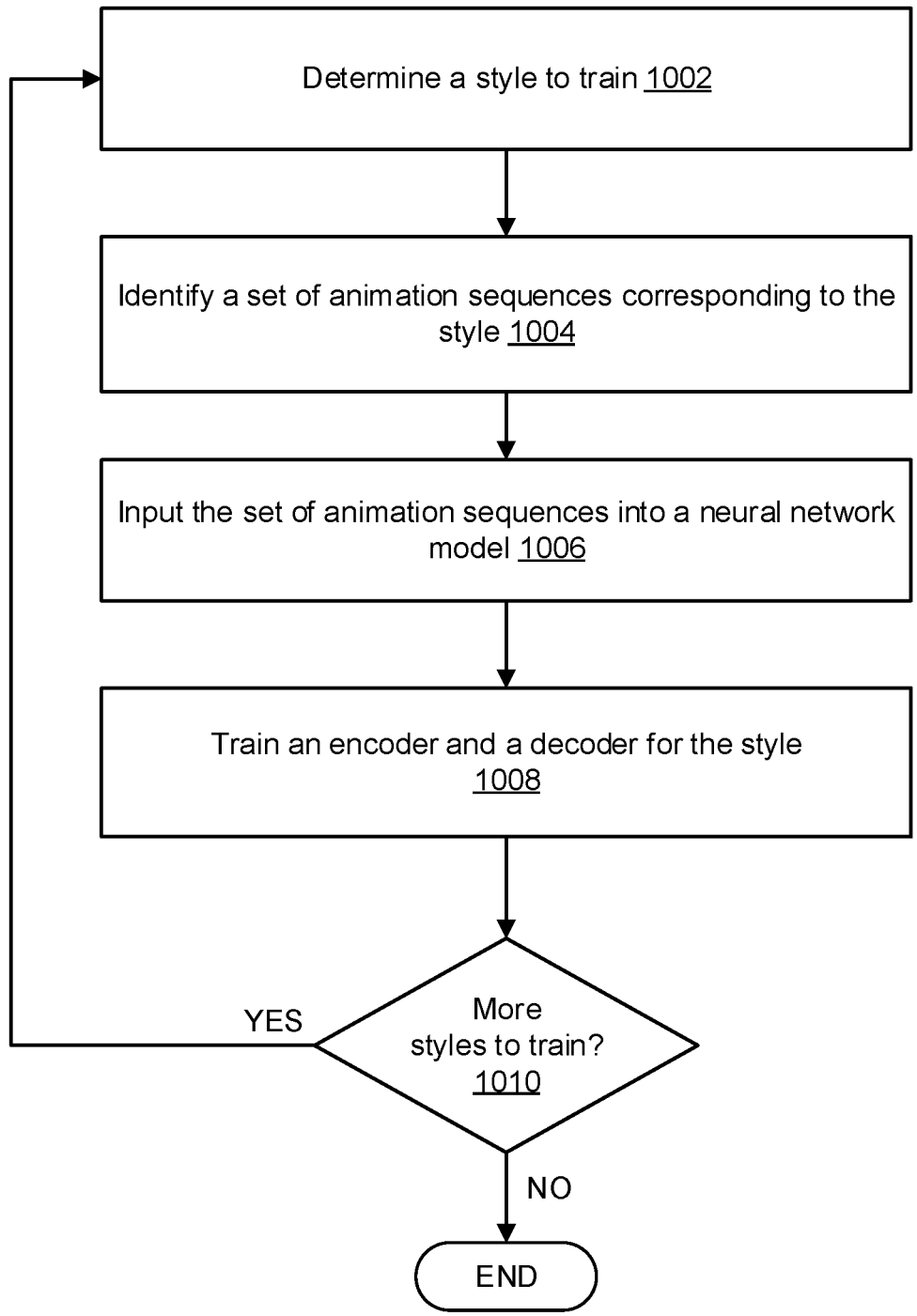
FIG. 10 is a flow diagram of method steps for training a neural network model for supervised animation style transfer, according to one embodiment.

FIG. 10 is a flow diagram of method steps for training a neural network model for supervised animation style transfer, according to one embodiment. In various implementations, the method can be performed by the processor 110, the graphics processor 116, or a combination of the processor 110 and the graphics processor 116.

As shown, the method begins at step 1002, where a processor determines a style to train. As described, in supervised animation style transfer, a separate encoder and a separate decoder is trained for each style.

At step 1004, the processor identifies a set of animation sequences corresponding to the style. In one embodiment, identifying the set of animation sequences corresponding to the style being trained can be based on identifying the set if animation sequences that include a style tag for the style being trained. In another embodiment, a user may manually partition (i.e., select) a set of animations that correspond to the style being trained.

At step 1006, the processor inputs the set of animation sequences into a neural network model. As previously described, the neural network model may comprise an autoencoder implemented as a CNN.

At step 1008, the processor trains an encoder and a decoder for the style. The encoder is configured encode an input animation sequence into a compressed space representation. The decoder is configured generate an animation sequence corresponding to the style of the decoder from a compressed space representation of an animation sequence.

At step 1010, the processor determines whether there are more styles to process. If yes, then the method returns to step 1002, described above, to train an encoder and a decoder for other styles. In no more styles are left to be trained, the method ends.

Figure 11:
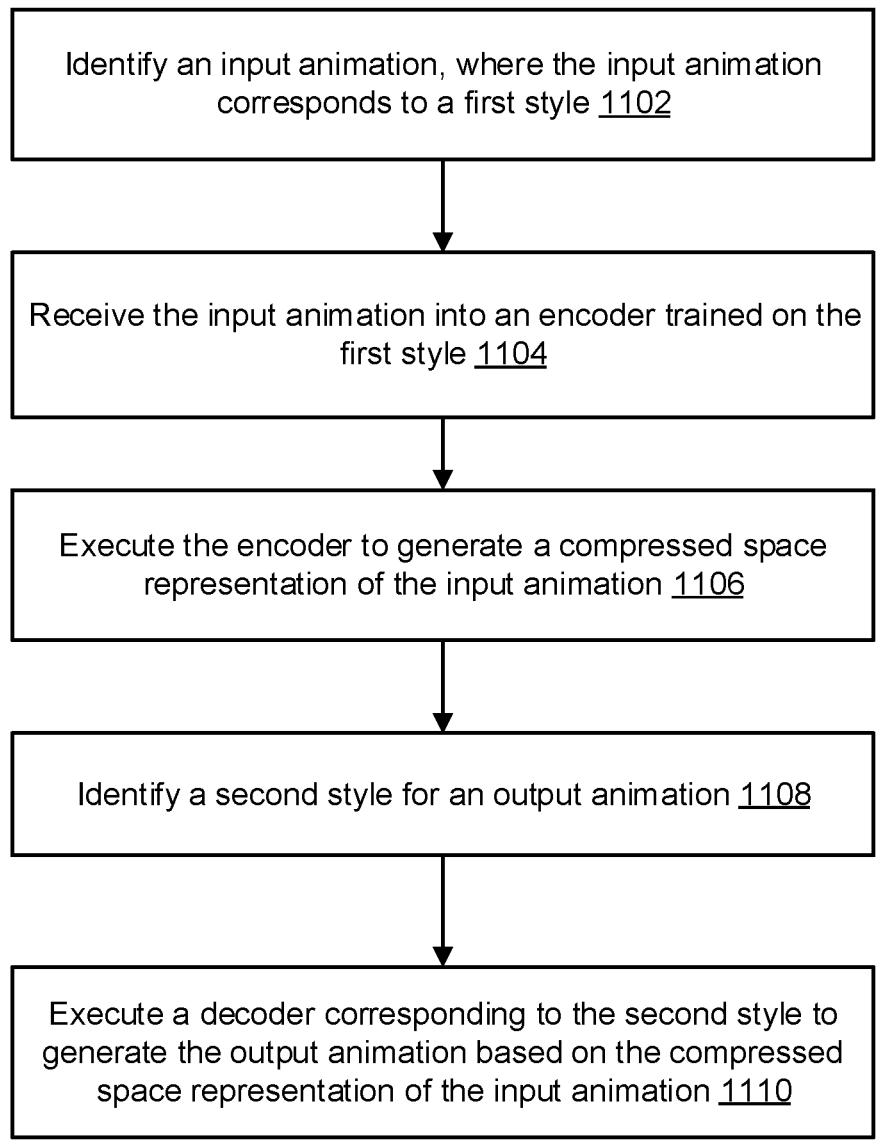
FIG. 11 is a flow diagram of method steps for executing a neural network model to perform supervised animation style transfer, according to one embodiment.

FIG. 11 is a flow diagram of method steps for executing a neural network model to perform supervised animation style transfer, according to one embodiment. In various implementations, the method can be performed by the processor 110, the graphics processor 116, or a combination of the processor 110 and the graphics processor 116.

As shown, the method begins at step 1102, where a processor identifies an input animation, where the input animation corresponds to a first style. In one example implementation, the first style to be replaced with a second style using supervised animation style transfer. In some embodiments, the input animation may also be associated with one or more additional styles that would remain following the animation style transfer from the first style to the second style.

At step 1104, the processor receives the input animation into an encoder trained on the first style. In one embodiment, the encoder has been trained for the first style using the technique described in FIG. 10. Other encoders (not used) may have also been trained for other styles.

At step 1106, the processor executes the encoder corresponding to the first style to generate a compressed space representation of the input animation. In one embodiments, the compressed space representation may be a vector corresponding to the input animation.

At step 1108, the processor identifies a second style for an output animation. As described, the first style from the input animation will be replaced with the second style. In one embodiment, the second style is different than the first style. For example, the first style may be a "happy" emotion style, and the second style may be a "sad" emotion style.

At step 1110, the processor executes a decoder corresponding to the second style to generate the output animation based on the compressed space representation of the input animation. Again, as described, a separate decoder may have been trained using the technique of FIG. 10 for each style. The decoder corresponding to the second style is executed at step 1110, and other decoders for other styles are unused. The output animation, therefore, is similar to the input animation, except the first style of the input animation has been replaced with the second style.

In another embodiment, the first style and the second style are the same (e.g., both "adult" animation style). In some cases, when the input animation is compressed into the compressed space representation by the encoder, some of the details of the motion are lost. Therefore, when the compressed space representation is reconstructed using the decoder corresponding to the same style as the encoder that encoded the input animation, the output animation is not identical to the input animation. The output animation would still have the same style as the input animation, but there may be some variation in the input and output animation sequences. This may be desirable in some implementations to generate animations that include some variation. For example, if a scene includes a large number of characters in a group all performing the same general motion (e.g., running) it may look strange to an observer if all the characters were performing precisely the same movements. Adding some nominal variation in the aminations for different characters in this manner may create more visually pleasing results.

In another embodiment, the method shown in FIG. 11 can be repeated multiple times. For example, say that an input animation has four styles: A, B, C, D. The input animation can be processed using the method of FIG. 11 to transfer style "B" in the input animation to style "E." The resulting output animation would have four styles: A, E, C, D. The resulting output animation can then be processed using the method of FIG. 11 again to transfer style "C" in the resulting output animation to style "F." A second resulting output animation would therefore have four styles: A, E, F, D. This is similar to the example shown in FIG. 6.

Unsupervised Animation Style Transfer

Another embodiment for animation style transfer is referred to herein as "unsupervised animation style transfer." As described previously, in "supervised" animation style transfer, the style from the input animation being replaced and the output animation style are identified in advance, i.e., in order to use the appropriate encoder to encode the input animation and to use the appropriate decoder for the output animation. By contrast, in "unsupervised" animation style transfer, expressly identifying the input style and output style can be avoided.

Figure 12:
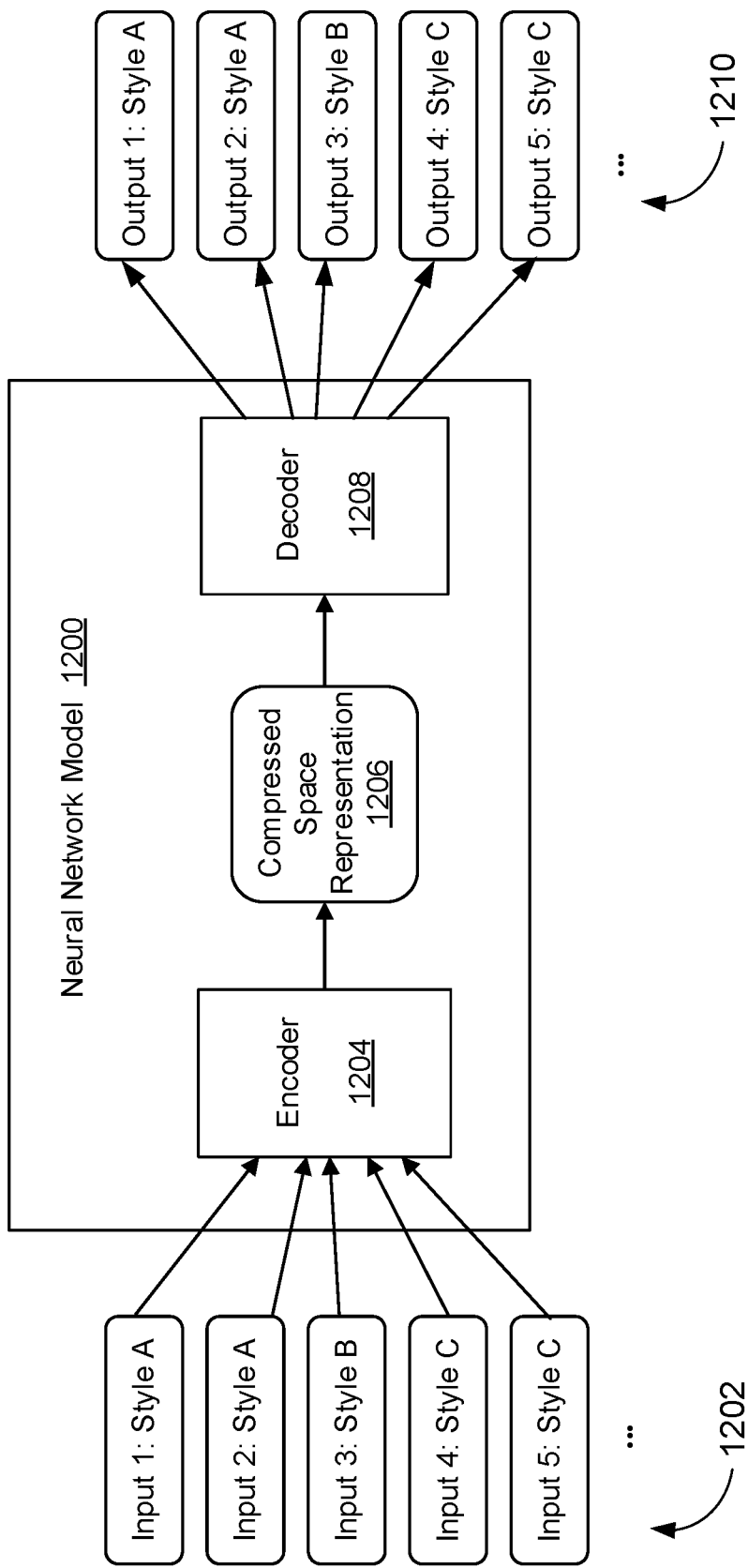
FIG. 12 is block diagram illustrating training a neural network model to transfer a style to an input animation to generate an output animation using unsupervised animation style transfer, according to one embodiment.

FIG. 12 is block diagram illustrating training a neural network model 1200 to transfer a style to an input animation to generate an output animation using unsupervised animation style transfer, according to one embodiment. In unsupervised animation style transfer, there is one encoder 1204 and one decoder 1208 in the model 1200.

A series of input animations 1202 is input into the neural network model 1200. In one embodiment, the neural network model 1200 is an autoencoder having an encoder 1204 configured to compress an input to a compressed space representation 1206, and a decoder 1208 configured to reconstruct an output based on the compressed space representation 1206. The autoencoder may be implemented as a convolutional neural network (CNN).

In the example shown in FIG. 12 for training the encoder 1204 and decoder 1208, each input animation 1202 may be associated with a style tag corresponding to a style in the input animation. In the example shown, various input animations 1202 correspond to styles "A," "B," and "C." In some cases, a given animation sequence may correspond to two or more styles (e.g., one input animation may be associated with both style "A" and style "C"). In such a case where one input animation is associated with two or more styles, in one embodiment, the animation sequence can be input into the model 1200 two or more times, once for each different style. In other embodiments, each input animation that is associated with two or more styles is input into the encoder 1204 once, and the encoder 1204 is configured to identify each individual style from the input animation during training (e.g., by reading style tags associated with the input animation).

For a given input animation having one or more known styles, the encoder 1204 is trained to map the sequence of motion of the input animation into a "compressed space representation" (also referred to as a "latent space representation") 1206. The compressed space representation 1206 represents both style and content of the input animation. In one embodiment, the compressed space representation 1206 may be a fixed length vector that provides a compressed space representation of the input animation. The data in the compressed space representation 1206 is then input into a decoder 1208 that is trained to recover the motion in the corresponding input animation from the compressed space representation 1206, wherein the reconstructed input animations are shown as outputs 1210.

In other words, the neural network model 1200 is trained to identify the style and content in the input animation 1202 and encode a corresponding compressed space representation 1206 using the encoder 1204. The decoder 1208 is then configured to identify style and content in the compressed space representation 1206 in order to properly decode the compressed space representation 1206.

Figure 13:
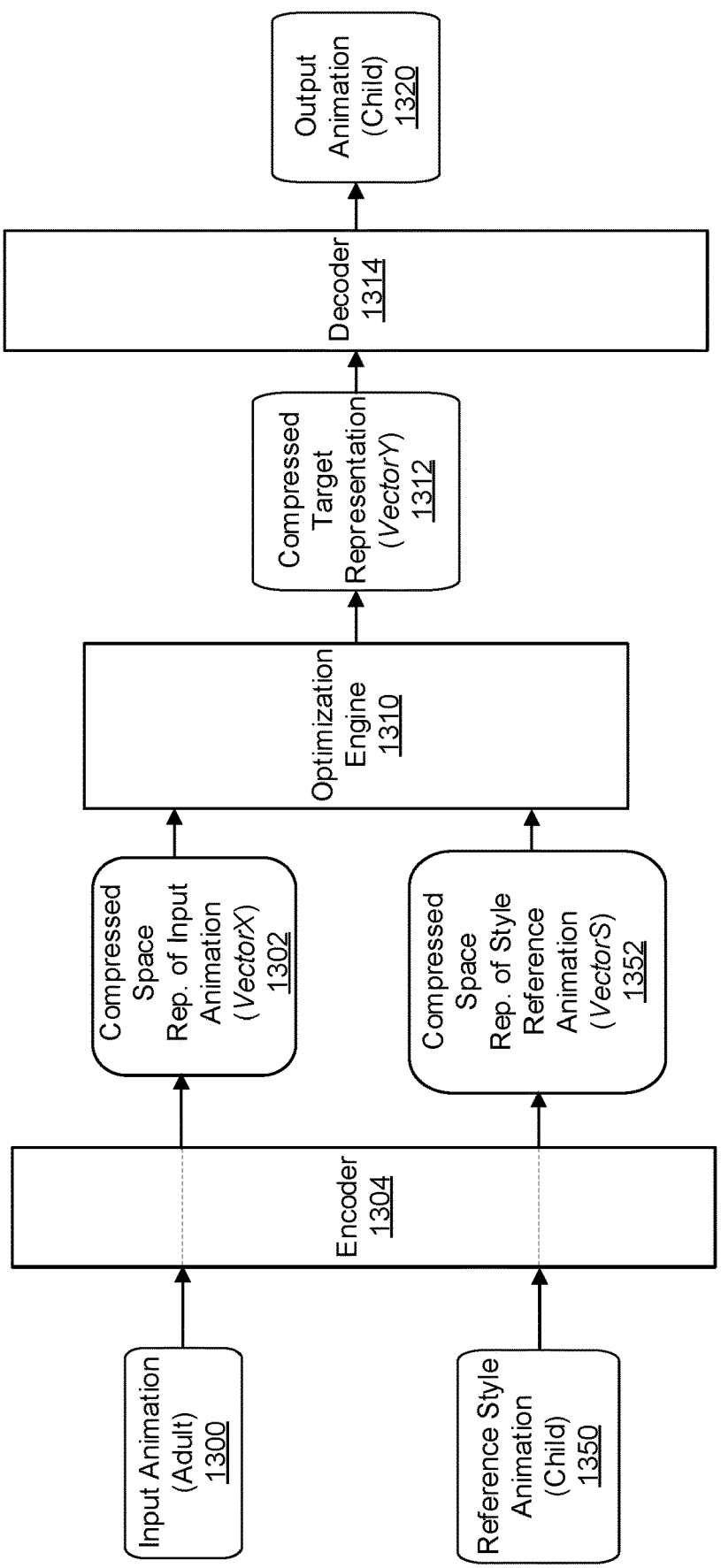
FIG. 13 is a conceptual diagram illustrating executing a model for unsupervised animation style transfer to generate an output animation, according to one embodiment.

FIG. 13 is a conceptual diagram illustrating executing a model for unsupervised animation style transfer to generate an output animation, according to one embodiment. As shown in FIG. 13, an input animation 1300 is selected from a set of existing animations sequences. As described, the input animation 1300 is tagged as corresponding to a set of one or more animations styles, or may by any arbitrary untagged animation sequence. In the example shown, the input animation 1300 is an "adult" style animation. Also provided is a reference style animation 1350. In various embodiments, the reference style animation 1350 may be tagged as corresponding to a set of one or more animations styles, or may by any arbitrary untagged animation sequence. In the example shown, the reference style animation 1350 is a "child" style animation.

In one embodiment, the goal of the unsupervised style transfer model shown in FIG. 13 is to generate an output animation 1320 in which the style of the reference style animation 1350 is transferred to the input animation 1300.

To accomplish this, the input animation 1300 is input into the encoder 1304 (e.g., the encoder trained as shown in FIG. 12). Upon processing the input animation 1300, the output of the encoder 1304 is a compressed space representation 1302 of the input animation 1300. In addition, the reference style animation 1350 is input into the encoder 1304. Upon processing the reference style animation 1350, the output of the encoder 1304 is a compressed space representation 1352 of the reference style animation 1350. Each of the compressed space representations 1302, 1352 may comprise a fixed length vector. In the example shown, the compressed space representation 1302 of the input animation 1300 is referred to as "vectorX" and the compressed space representation 1352 of reference style animation 1350 is referred to as "vectorS". These two vectors are then input into an optimization engine 1310.

In one implementation, the optimization engine 1310 is configured to output a compressed target representation 1312 (referred to as "vector)") to be used by the decoder 1314 to generate the output animation 1320. The compressed target representation 1312 ("vectorY") can be obtained by optimizing the equation:

$$\min[\text{diff}(\text{vectorX}-\text{vectorY})+\text{diff}(\text{Style}(\text{vectorS})-\text{Style}(\text{vectorY}))]$$

In the above equation, the similarity of styles of vectorS and vectorY is computed through diff (Style(vectorS)−Style (vectorY)). In one embodiment, the function Style( ) is obtained by using a gram matrix. A gram matrix is calculated by the inner products of feature vectors. Since an inner product represents similarity between feature vectors, the inner product can be a good indicator of style of a compressed space vector.

In general, the optimization engine 1310 performs processing to attempt to discern what is the style of the reference style animation 1350 that should be transferred into the input animation 1300, while at the same time maintaining other aspects of the input animation 1300.

The compressed target representation 1312 is then input into the decoder 1314 (e.g., the decoder trained as shown in FIG. 12). The decoder 1314 processes the compressed target representation 1312 to generate the output animation 1320. In the example shown, the "adult" style of the input animation 1300 is replaced with the "child" style of the reference style animation 1350. The output animation is generated without expressly identifying that the input animation had an "adult" style or that the reference style animation 1350 had a "child" style, thereby implementing "unsupervised" animation style transfer.

Figure 14:
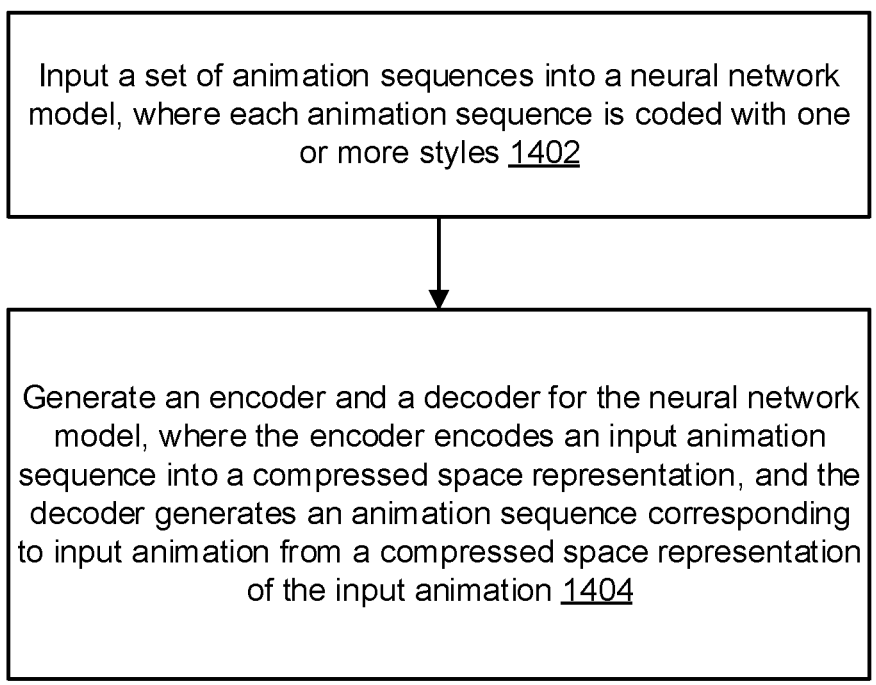
FIG. 14 is a flow diagram of method steps for training a neural network model for unsupervised animation style transfer, according to one embodiment.

FIG. 14 is a flow diagram of method steps for training a neural network model for unsupervised animation style transfer, according to one embodiment. In various implementations, the method can be performed by the processor 110, the graphics processor 116, or a combination of the processor 110 and the graphics processor 116.

As shown, the method begins at step 1402, where a processor inputs a set of animation sequences into a neural network model, where each animation sequence is coded with one or more styles.

At step 1404, the processor generates an encoder and a decoder for the neural network model, where the encoder encodes an input animation sequence into a compressed space representation, and the decoder generates an animation sequence corresponding to input animation from a compressed space representation of the input animation.

Figure 15:
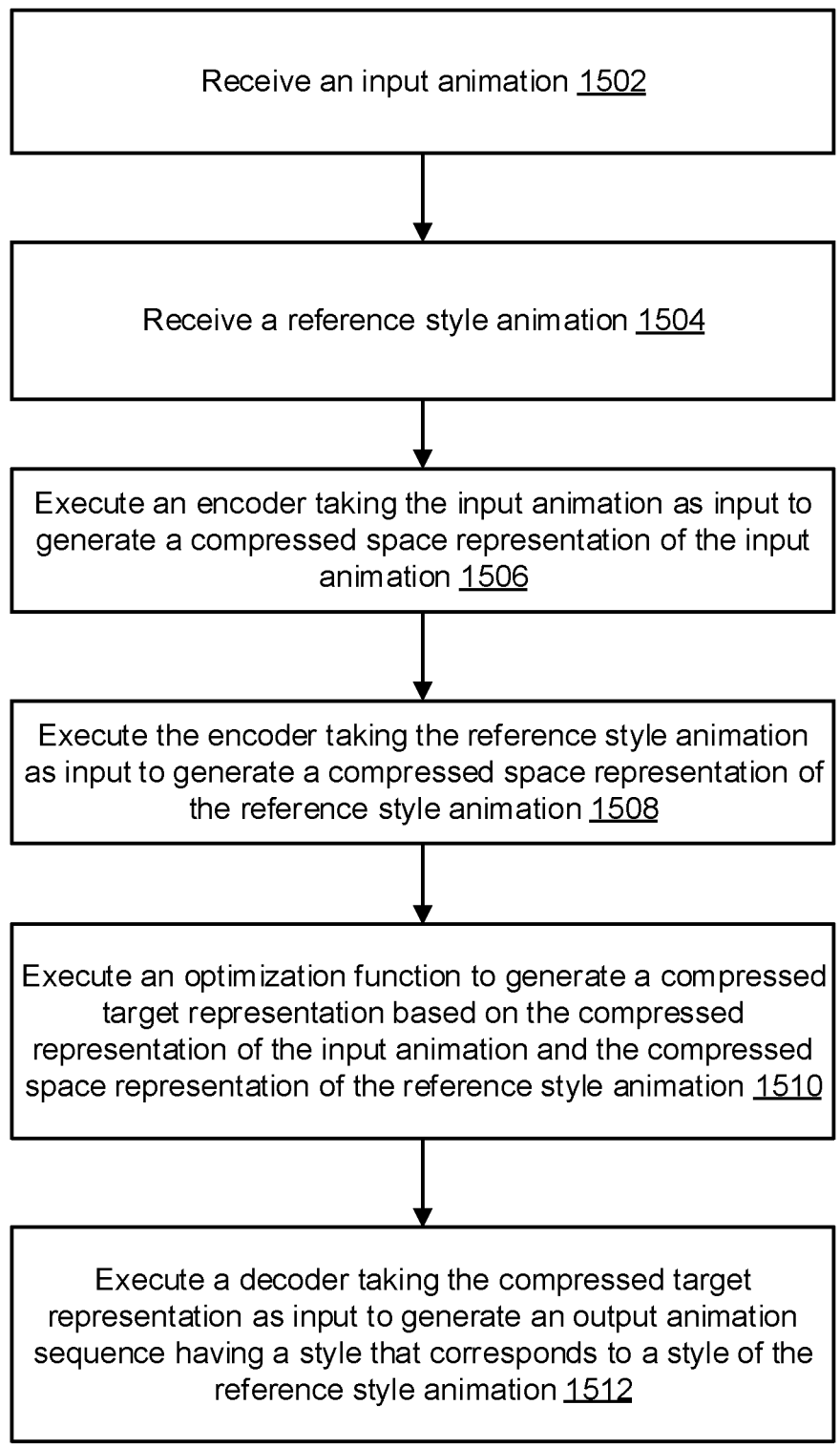
FIG. 15 is a flow diagram of method steps for executing a neural network model to perform unsupervised animation style transfer, according to one embodiment.

FIG. 15 is a flow diagram of method steps for executing a neural network model to perform unsupervised animation style transfer, according to one embodiment. In various implementations, the method can be performed by the processor 110, the graphics processor 116, or a combination of the processor 110 and the graphics processor 116.

As shown, the method begins at step 1502, where a processor receives an input animation. At step 1504, the processor receives a reference style animation.

At step 1506, the processor executes an encoder taking the input animation as input to generate a compressed space representation of the input animation. At step 1508, the processor executes the encoder (i.e., the same encoder that processed the input animation at step 1506) taking the reference style animation as input to generate a compressed space representation of the reference style animation.

At step 1510, the processor executes an optimization function to generate a compressed target representation based on the compressed space representation of the input animation and the compressed space representation of the reference style animation. As described above, the optimization function performs processing to attempt to discern what is the style of the reference style animation that should be transferred into the input animation, while at the same time maintaining other aspects of the input animation.

At step 1512, the processor executes a decoder taking the compressed target representation as input to generate an output animation sequence having a style that corresponds to a style of the reference style animation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for generating an animation sequence, the method comprising:

receiving, by one or more processors, an input animation sequence, wherein the input animation sequence comprises character position information over a series of frames and a first style tag;

receiving, by the one or more processors, a reference style animation sequence, wherein the reference style animation sequence comprises character position information over a series of frames and a second style tag;

executing, by the one or more processors, an encoder to process the input animation sequence to generate a compressed representation of the input animation sequence (Vector X), wherein the compressed representation of the input animation sequence (Vector X) comprises a vector representing the input animation sequence;

executing, by the one or more processors, the encoder to process the reference style animation sequence to generate a compressed representation of the reference style animation sequence (Vector S), wherein the compressed representation of the reference style animation sequence (Vector S) comprises a vector representing the reference style animation sequence;

performing, by the one or more processors, an optimization function based on the compressed representation of the input animation sequence (Vector X) and the compressed representation of the reference style animation sequence (Vector S) to generate a compressed target representation (Vector Y), wherein performing the optimization function comprises minimizing an equation formed by a sum of (i) a difference between compressed representation of the input animation sequence (Vector X) and the compressed target representation (Vector Y), and (ii) a difference between applying a style function to the compressed representation of the reference style animation (Style(Vector S)) and applying the style function applied to the compressed target representation (Style(Vector Y)); and executing, by the one or more processors, a decoder to generate an output animation sequence based on the compressed target representation (Vector Y), wherein the output animation sequence comprises character position information over a series of frames, and wherein the output animation sequence comprises the second style tag.

2. The method according to claim 1, further comprising: training the encoder based a first set of animation sequences, wherein each animation sequence in the first set of animation sequences corresponds to the first style tag.

3. The method according to claim 2, further comprising: training the decoder based a second set of animation sequences, wherein each animation sequence in the second set of animation sequences corresponds to the second style tag.

4. The method according to claim 3,
wherein the first set of animation sequences is different than the second set of animation sequences; and
wherein the first style tag is different than the second style tag.

5. The method according to claim 3,
wherein the first set of animation sequences is the same as the second set of animation sequences; and
wherein the first style tag is the same as the second style tag.

6. The method according to claim 1, wherein style tags associated with animation sequences are organized into style categories, wherein the style categories include at least one of:
an adult/child motion style category;
a motion actions style category;
a gender style category; or
an emotion style category.

7. The method according to claim 1, further comprising:
training the encoder based a set of training animation sequences, wherein each training animation sequence in the set of training animation sequences is coded with one or more style tags; and
training the decoder based the set of training animation sequences, wherein for each training animation sequence in the set of training animation sequences, the decoder is configured to reconstruct an output animation sequence that approximates the training animation sequence based on decoding a compressed representation of the training animation sequence encoded by the encoder.

8. The method according to claim 1, wherein applying the style function comprises computing an inner product of feature vectors of a compressed vector space.

9. A non-transitory computer-readable storage medium storing instructions that, when executed by one or more processors, cause a computing device to generate an animation sequence, by performing the steps of:
receiving an input animation sequence, wherein the input animation sequence comprises character position information over a series of frames and a first style tag;

receiving a reference style animation sequence, wherein the reference style animation sequence comprises character position information over a series of frames and a second style tag;

executing an encoder to process the input animation sequence to generate a compressed representation of the input animation sequence (Vector X), wherein the compressed representation of the input animation sequence (Vector X) comprises a vector representing the input animation sequence;

executing the encoder to process the reference style animation sequence to generate a compressed representation of the reference style animation sequence (Vector S), wherein the compressed representation of the reference style animation sequence (Vector S) comprises a vector representing the reference style animation sequence;

performing an optimization function based on the compressed representation of the input animation sequence (Vector X) and the compressed representation of the reference style animation sequence (Vector S) to generate a compressed target representation (Vector Y), wherein performing the optimization function comprises minimizing an equation formed by a sum of (i) a difference between compressed representation of the input animation sequence (Vector X) and the compressed target representation (Vector Y), and (ii) a difference between applying a style function to the compressed representation of the reference style animation (Style(Vector S)) and applying the style function applied to the compressed target representation (Style(Vector Y)); and executing a decoder to generate an output animation sequence based on the compressed target representation (Vector Y), wherein the output animation sequence comprises character position information over a series of frames, and wherein the output animation sequence comprises the second style tag.

10. The computer-readable storage medium according to claim 9, the steps further comprising:
training the encoder based a first set of animation sequences, wherein each animation sequence in the first set of animation sequences corresponds to the first style tag; and
training the decoder based a second set of animation sequences, wherein each animation sequence in the second set of animation sequences corresponds to the second style tag.

11. The computer-readable storage medium according to claim 10, wherein the first set of animation sequences is different than the second set of animation sequences, and wherein the first style tag is different than the second style tag.

12. The computer-readable storage medium according to claim 9, the steps further comprising:
training the encoder based a set of training animation sequences, wherein each training animation sequence in the set of training animation sequences is coded with one or more style tags; and
training the decoder based the set of training animation sequences, wherein for each training animation sequence in the set of training animation sequences, the decoder is configured to reconstruct an output animation sequence that approximates the training animation sequence based on decoding a compressed representation of the training animation sequence encoded by the encoder.

13. The computer-readable storage medium according to claim 9, wherein applying the style function comprises computing an inner product of feature vectors of a compressed vector space.

14. The computer-readable storage medium according to claim 10,
wherein the first set of animation sequences is the same as the second set of animation sequences, and wherein the first style tag is the same as the second style tag.

15. A device for generating an animation sequence, the device comprising:
a memory storing instructions; and
one or more processors configured to the execute the instructions to cause the device to:
receive an input animation sequence, wherein the input animation sequence comprises character position information over a series of frames and a first style tag;
receive a reference style animation sequence, wherein the reference style animation sequence comprises character position information over a series of frames and a second style tag;
execute an encoder to process the input animation sequence to generate a compressed representation of the input animation sequence (Vector X), wherein the compressed representation of the input animation sequence (Vector X) comprises a vector representing the input animation sequence;
execute the encoder to process the reference style animation sequence to generate a compressed representation of the reference style animation sequence (Vector S), wherein the compressed representation of the reference style animation sequence (Vector S) comprises a vector representing the reference style animation sequence;
perform an optimization function based on the compressed representation of the input animation sequence (Vector X) and the compressed representation of the reference style animation sequence (Vector S) to generate a compressed target representation (Vector Y), wherein performing the optimization function comprises minimizing an equation formed by a sum of (i) a difference between compressed representation of the input animation sequence (Vector X) and the compressed target representation (Vector Y), and (ii) a difference between applying a style function to the compressed representation of the reference style animation (Style (Vector S)) and applying the style function applied to the compressed target representation (Style(Vector Y)); and
execute a decoder to generate an output animation sequence based on the compressed target representation (Vector Y), wherein the output animation sequence comprises character position information over a series of frames, and wherein the output animation sequence comprises the second style tag.

16. The device according to claim 15, wherein executing the instructions further causes the device to:
train the encoder based a first set of animation sequences, wherein each animation sequence in the first set of animation sequences corresponds to the first style tag; and
train the decoder based a second set of animation sequences, wherein each animation sequence in the second set of animation sequences corresponds to the second style tag.

17. The device according to claim 15, wherein executing the instructions further causes the device to:
train the encoder based a set of training animation sequences, wherein each training animation sequence in the set of training animation sequences is coded with one or more style tags; and
train the decoder based the set of training animation sequences, wherein for each training animation sequence in the set of training animation sequences, the decoder is configured to reconstruct an output animation sequence that approximates the training animation sequence based on decoding a compressed representation of the training animation sequence encoded by the encoder.

18. The device according to claim 15, wherein applying the style function comprises computing an inner product of feature vectors of a compressed vector space.

* * * * *